Dec. 4, 1962   K. SCHWARTMANN ETAL   3,066,611
MEMBRANE PUMP

Filed July 8, 1960   2 Sheets-Sheet 1

INVENTORS
KARL SCHWARTMANN
MANFRED FISCHBACH
By Toulmin & Toulmin
Attorneys

INVENTORS
KARL SCHWARTMANN
MANFRED FISCHBACH
By Toulmin & Toulmin
Attorneys

United States Patent Office 3,066,611
Patented Dec. 4, 1962

3,066,611
MEMBRANE PUMP
Karl Schwartmann, 36, Tunnelstrasse, Wuppertal-Barmen, Germany, and Manfred Fischbach, 8, Altenberstrasse, Neunkirchen, kreis Ziegen, Germany
Filed July 8, 1960, Ser. No. 41,657
Claims priority, application Germany July 10, 1959
5 Claims. (Cl. 103—53)

The present invention relates to pumps and more in particular to a membrane pump with electromagnetic driving means for conveying gaseous or liquid media.

It is an object of the present invention to provide an electromagnetically driven membrane pump of comparatively small size but with great power output for conveying gaseous or liquid media.

It is another object of the present invention to provide such a pump which operates almost noiselessly.

It is a further subject of the present invention to provide a pump of the above-mentioned type the power output of which can be delicately adjusted, and wherein the values of adjustment can be easily obtained by a simple reading.

It is still another object of the present invention to provide a pump of the above-described type the reciprocating elements of which operate regularly, uniformly and with great stability without requiring special guide or support elements.

It is yet another object of the present invention to provide a pump of the above-mentioned type which is so constructed that its membrane has a very long service life.

These objects are achieved by the membrane pump of the present invention which comprises an electric magnet and, associated therewith, a permanent magnet. The electric magnet is supplied with alternating current by a conventional A.C. source and produces an electromagnetic field. The permanent magnet is disposed in this magnetic field and, at the same time, is connected with the membrane, so that the reciprocating movement imparted to the permanent magnet as the polarity of the electric magnet changes is imparted to the membrane. This makes it unnecessary to supply additional mechanical force to the membrane, the stable and constant reciprocating movement of the permanent magnet being sufficient to actuate the membrane. The oscillations of the permanent magnet will be in substantially complete harmony with the alternating current frequency in the electric magnet.

The membrane pump of the invention can be further provided with adjusting means for varying the relative distance between the permanent magnet and the electric magnet. The provision of such adjusting means makes it possible to vary the power output of the pump. In order to enable adjustment of the electric magnet the latter is displaceably screwed by means of a spindle nut onto a spindle positioned in the cover of the pump casing. The spindle can be provided with an actuating knob external of the casing, the adjustment being effected by turning this knob. Furthermore, a pressure spring is provided between the cover of the pump casing in the displaceable electric magnet in order to stabilize the respective adjusted position of the electric magnet. It will be apparent that the adjusting means must be so devised that the permanent magnet and the electric magnet are prevent from touching each other.

The adjusting means can be provided with reading means for obtaining the particular adjusted value which may consist, for example, of a pointer connected with the actuating knob and scale means associated with the pointer.

The aforementioned adjusting means effect a satisfactory coarse adjustment. They may, however, be supplemented by fine adjusting means. The pump body is, for example, displaceably positioned in the bottom portion of the pump casing and attached to the latter by a screw projecting from the outside into the interior of the pump casing through the casing bottom. This screw is simultaneously used as an adjusting screw for displacing the pump body. A resilient disk may be provided between the pump casing bottom and the pump body, which may consist of a sealing material so as to effect a sealing between the pumping casing and the pump body.

The uniformity and stability of movement of the reciprocating permanent magnet connected with the memberane can be further improved by providing the same with a weight, preferably on the inner side of the membrane facing the pressure space of the pump body. The provision of such a weight makes it possible to keep the permanent magnet within the desired optimum operating range; since the range of oscillation of the permanent magnet and the membrane are limited, the service life of the latter is considerably increased and, at the same time, the permanent magnet is prevented from hitting against the electric magnet. Preferably, support means in the permanent magnet are provided on one side of the membrane, and the weight is provided on the opposite side of the membrane, with stressing means being provided both between the support means and the membrane and between the weight and the membrane. Preferably, the diameter of the stressing means between the support means and the membrane is greater than the diameter of the stressing means between the weight and the membrane and, more preferably still, the two stressing means have a diameter ratio in the range of about 0.8–1.0.

The medium to be conveyed is introduced into the pump casing through an opening at the upper end of the casing which opening may either be the end of a channel running through the casing wall down to the bottom or of a pipe conduit attached to the pumping casing. The medium then flows through the entire casing to the pump body on the bottom of the pump casing. The medium thus covers a comparatively long traveling distance which contributes to make the operation of the pump noiseless and, at the same time, makes it possible to use the medium for cooling the electric magnet.

The invention will be more fully appreciated from the following description of the accompanying drawings, wherein.

Figure 4:
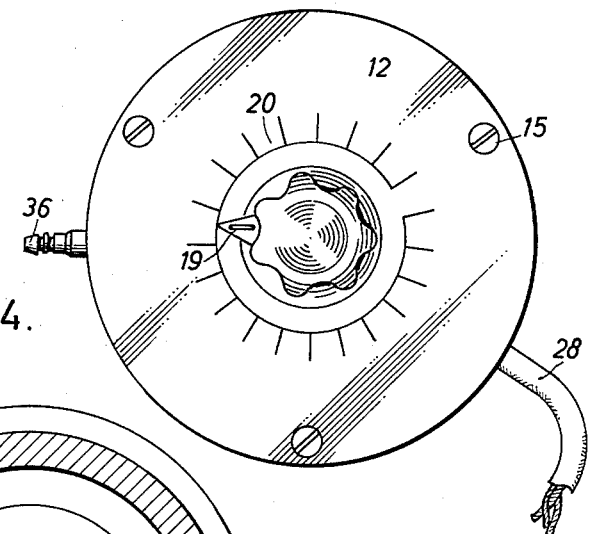
FIGURE 4 is a plan view of the pump casing.
Figure 5:
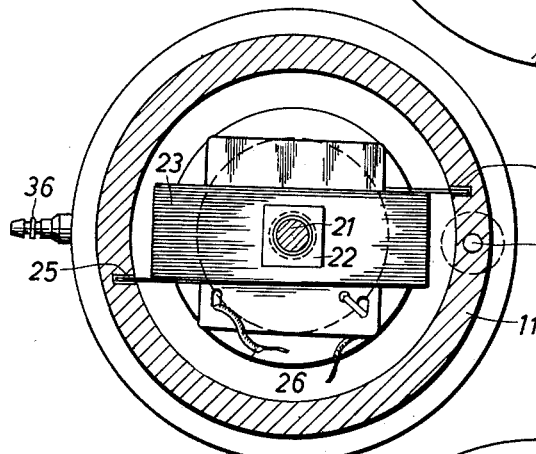
FIGURE 5 is a cross-sectional view of the pump casing, following lines V—V in FIGURE 1.
Figure 6:
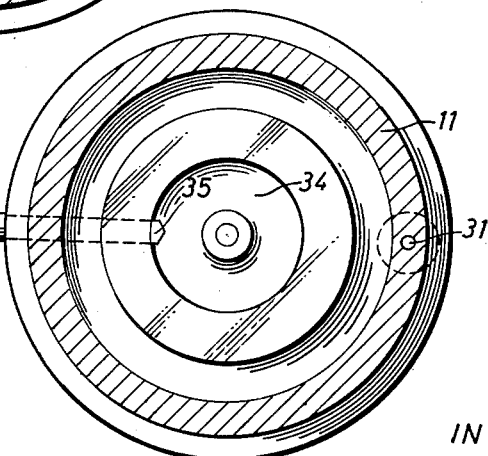
FIGURE 6 is a cross-sectional view of the pump casing along lines VI—VI in FIGURE 1, but with the pump body having been removed from the casing.
Figure 7:
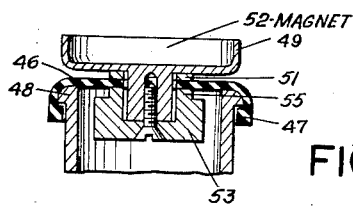
FIGURE 7 is an enlarged cross-sectional view of the upper end of the pump.

Referring now to the drawings more in detail, the pump casing of the membrane pump according to the invention consists of a body portion 10, a cylindrical central portion 11 and a cover 12. The cylindrical central portion 11 is attached to the bottom portion 10 by means of screws 14. The screws 14 simultaneously fix hollow rubber supports 13 against the bottom portion 10. The cover 12 is connected with the central portion 11 by means of screws 15. Cover 12 has a central boring 16 in which is positioned the shaft 17 of an external actuating knob 18. The latter has a pointer 19 above a scale 20 (see in particular FIGURE 4). Shaft 17 has an extension forming a spindle 21. The membrane pump further comprises an electric magnet 23 screwed upon the spindle 21 by means of nut 22. The electric magnet 23 has lateral flanges 24 adapted to run in slot guides 25 provided in the cylindrical central portion 11 of the pump casing. The electric magnet can be of a conventional type and is connected with a terminal 27 via line 26, terminal 27 being connected with a lead 28, supplying power from a suitable current source.

Figure 1:
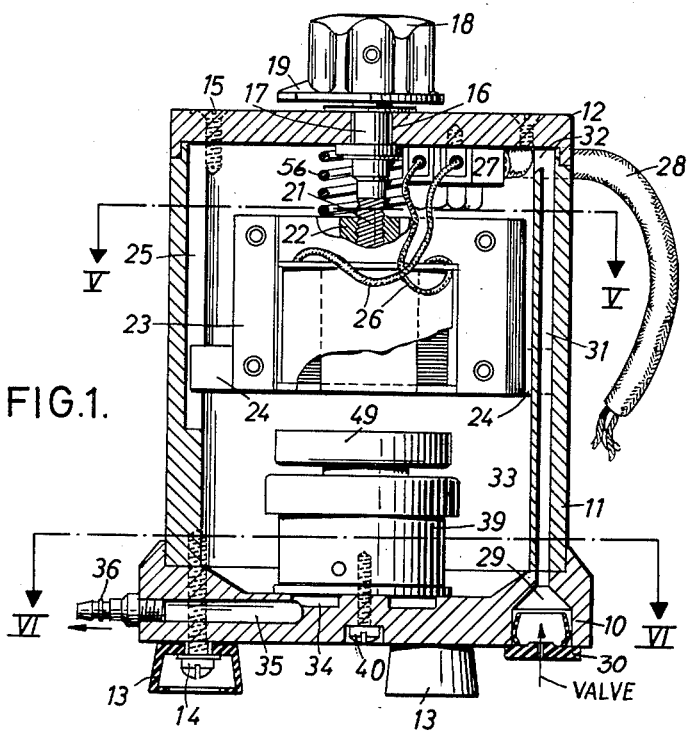
FIGURE 1 is a longtiudinally sectional view of the membrane pump according to the invention.
Figure 2:
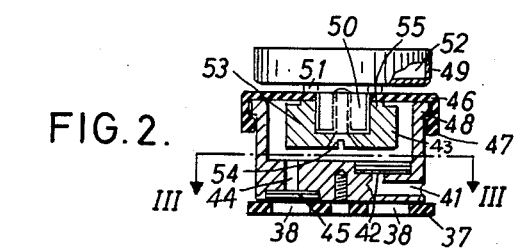
FIGURE 2 is a longitudinally sectional view of the pump body in the membrane pump of FIGURE 1.
Figure 3:
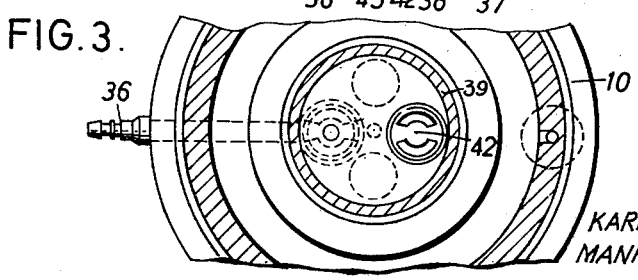
FIGURE 3 is a cross-sectional view of the pump body taken along lines III—III in FIGURE 2.

The bottom portion 10 of the pump casing has an inlet opening 29 with a valve 30 adapted to close opening 29. Opening 29 communicates with a channel 31 provided in the wall of central portion 11 and channel 31, in turn, leads into the internal space 33 of the pump casing via opening 32. Furthermore, the bottom portion 10 has a recess 34 communicating, via channel 35, with an outlet nipple 36 which latter is adapted for connection with a gas- or liquid-conveying hose or the like. As will be seen in FIGURE 2, a resilient disk 37 is positioned on recess 34, having openings 38. The pump body 39 is placed on this resilient disk 37 and, as shown in FIGURE 1, is connected with the bottom portion 10 by means of screw 40. The pump body has an inlet opening 41, communicating with the internal space 43 via a valve 42. The internal space 43 communicates with channel 35 via boring 44, a valve 45, and one of the borings 38 in the resilient disk 37. The upper opening of the pump casing is closed by the pump membrane 46 having a marginal bulge portion 47 gripping over the flange 48 of the pump body 39. A pot-shaped member 49 is placed on membrane 46 having a pivot 50 projecting through membrane 46. A stresser disk 51 is positioned between pot-shaped member 49 and membrane 46. The pot-shaped member 49 contains the magnetic body 52 of a permanent magnet. At the opposite side of the membrane 46 pivot 50 is connected with a weight 53 by means of screw 54. At its upper end weight 53 has a collar portion 55 acting as a counter stresser, cooperating with stresser disk 51. The ratio between the stresser disk 51 and the collar portion 55 is preferaby 0.8:1.0.

In operation, the electric magnet 23 will be connected with an A.C. source, not shown, via lead 28. As soon as current is supplied, the electric magnet 23 will be excited and will produce a magnetic field. The permanent magnet 49, 52, disposed in this magnetic field, then performs an alternating upward and downward movement, which is imparted to membrane 46. As a consequence of the action of membrane 46, alternating suction and pressure effects are produced in internal inlet chamber 43 of pump body 39. During an upward movement of permanent magnet 49, 52, and a consequent suction effect produced by membrane 46, air is taken in via valve 30, channel 31, opening 32, internal inlet chamber 33, inlet opening 41, and valve 42. During a downward movement of permanent magnet 49, 52, and a consequent pressure effect produced by membrane 46, air is pushed out of the pump via valve 45, opening 38 in resilient disk 37, recess 34, channel 35 and nipple 36, which then may be conveyed through a hose or the like, connected with nipple 36.

The power output of the pump can be varied by adjusting the distance of electric magnet 23 from the cover 12 through intermediate spring 56 on the one hand, or by adjusting the permanent magnet 52, 49 on the other hand. The membrane pump is thus provided with coarse adjusting means and fine adjusting means. The coarse adjustment is effected by displacing electric magnet 23 upwardly or downwardly in guides 25 via spindle 21 and actuating knob 18. The fine adjustment is effected by turning screw 40 in bottom portion 10, thereby varying the pressure on resilient disk 37 and, consequently, adjusting the position of pump body 39.

The pump of the present invention can be built of a very small size and still have a great power output. It is very accurately adjustable, has a high and, at the same time, stable and constant capacity for conveying gas or liquid media, and is characterized by a noiseless operation. These important advantages make it applicable for various purposes. It can be advantageously used as a conveyor pump for conveying gases and liquids in many industrial operations, and particularly in control systems. It can be used either as a suction pump or as a pressure pump in research, in the medical science, particularly for aerosol-therapy, and also as a ventilating, aerating or mixing pump.

It will be understood that this invention is susceptible to modification in order to adapt it to different usages and conditions and, accordingly, it is desired to comprehend such modifications within this invention as may fall within the scope of the appended claims.

What we claim is:

1. Electromagnetically driven membrane pump for conveying gaseous and liquid media comprising a casing, a membrane in said casing, an electric magnet in said casing adapted for connection with an A.C. source so as to produce a magnetic field, a permanent magnet connected with said membrane and disposed within the magnetic field produced by said electric magnet and performing, together with said membrane, a reciprocating movement as alternating current is supplied to said electric magnet, said permanent magnet being centrally disposed on said membrane, a pot-shaped means containing said permanent magnet, said permanent magnet being disposed on that side of said membrane opposite to said pump body, and a weight member disposed on said membrane in said pump body, and being connected with said permanent magnet.

2. An electromagnetically driven membrane pump for conveying gaseous and liquid media according to claim 1, with a flange portion on the upper end of said pump body and a peripheral bulged portion on said membrane gripping around said flange portion.

3. An electromagnetically driven membrane pump for conveying gaseous and liquid media according to claim 1, and comprising first stressing means disposed between said permanent magnet and said membrane, and second stressing means between said weight and said membrane.

4. An electromagnetically driven membrane pump for conveying gaseous and liquid media according to claim 1, and comprising first stressing means disposed between said permanent magnet and said membrane, and second stressing means between said weight and said membrane having a greater diameter than said first stressing means.

5. An electromagnetically driven membrane pump for conveying gaseous and liquid media according to claim 1, and comprising first stressing means disposed between said permanent magnet and said membrane, and second stressing means between said weight and said membrane having a greater diameter than said first stressing means, with the respective diameters of said first and second stressing means having a ratio of about 0.8–1.0.

References Cited in the file of this patent

UNITED STATES PATENTS

| | | |
|---|---|---|
| 2,809,589 | Randolph | Oct. 15, 1957 |
| 2,814,429 | Buchanan | Nov. 26, 1957 |
| 2,942,772 | Buchanan | June 28, 1960 |